July 3, 1956

W. H. AUGHEY ET AL 2,753,479

SPARK CELL ASSEMBLY

Filed April 8, 1953

INVENTORS
W. HENRY AUGHEY
WILLIAM S. HILLMAN

BY Edwin C. Woodhouse

ATTORNEY

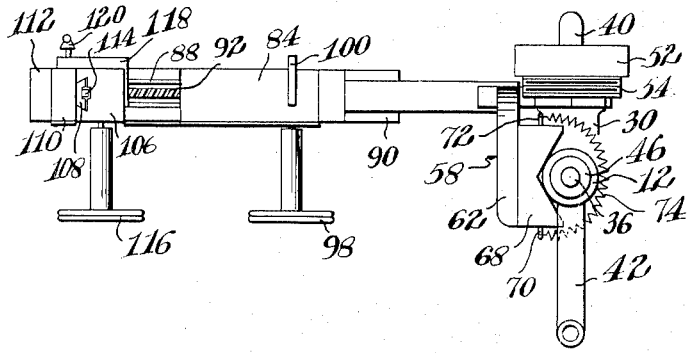
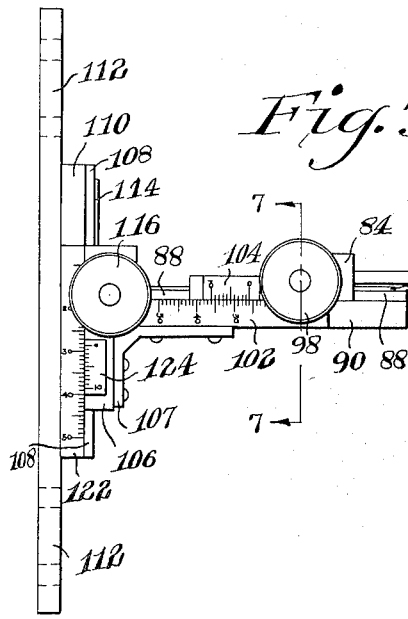
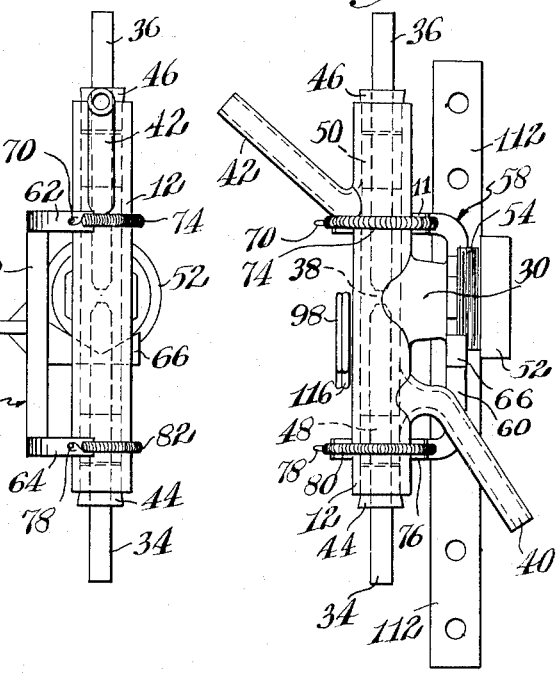
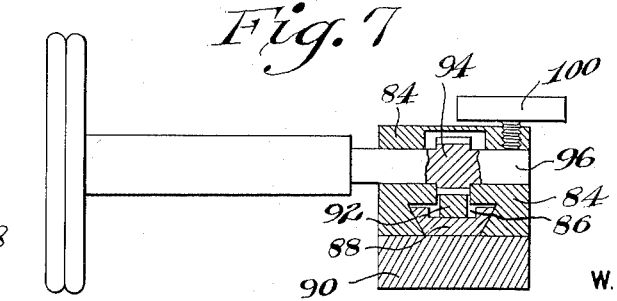

United States Patent Office 2,753,479
Patented July 3, 1956

2,753,479

SPARK CELL ASSEMBLY

William Henry Aughey, Arden, Del., and William S. Hillman, Woodstown, N. J., assignors to E. I. du Pont de Nemours and Company, Wilmington, Del., a corporation of Delaware Application April 8, 1953, Serial No. 347,602

3 Claims. (Cl. 313—231)

This invention relates to a spark cell assembly which is adapted to be employed with spectrographic apparatus for receiving and measuring the intensity of the radiation from the spark cell, and particularly for the spectrographic analysis of air and detecting minute amounts of tetraethyl lead in the air.

It is an object of the present invention to provide a novel spark cell assembly which overcomes the disadvantages of the prior devices. Another object is to provide a spark cell assembly which includes means permitting the accurate reproduction of a predetermined position of the spark gap and of the spark cell. A further object is to provide a spark cell assembly which can be readily disassembled and cleaned and then rapidly and easily reassembled with the parts accurately adjusted to their original desired positions. Other objects are to provide a novel combination of elements and to advance the art. Still other objects will appear hereinafter.

The above and other objects may be accomplished in accordance with our invention which comprises a novel spark cell assembly which includes a spark cell having a removable quartz radiation exit window, longitudinally adjustable aligned electrodes providing a spark gap opposite said window, and means for passing gas through the mid-portion of the tube and through the spark gap; a cradle member holding the spark cell in a predetermined position and separable fastening means detachably securing the spark cell in the cradle member; adjusting mechanism for varying the position of the cradle member and of the spark cell along a line lying in a plane perpendicular to the optical axis of the spectrographic apparatus, adjusting mechanism for varying the position of the cradle member and of the spark cell along a second line perpendicular to the first line and in the same plane, locking means for each of said adjusting mechanisms, and scales for indicating the adjusted positions.

Such spark cell assembly is adapted to be employed with spectrographic apparatus for receiving and measuring the intensity of the radiation from the spark cell and particularly in equipment to be used in the spectrographic analysis of the air in a plant for the manufacture of tetraethyl lead for the purpose of detecting leaks in the manufacturing apparatus. By reason of the structure of the spark cell assembly, the spark cell can be readily removed from the equipment, cleaned, and rapidly and easily reassembled and replaced in the equipment with the spark gap accurately readjusted to its original position relative to the optical axis of the spectrographic apparatus, whereby the equipment is ready for use without the delays previously caused by readjusting the position of the spark gap. Furthermore, even the delays caused by disassembling, cleaning and reassembling the spark cell can be eliminated by replacing the dirty spark cell by a similar clean spark cell the desired adjusted position of which has been previously determined and recorded.

Our invention will be best understood from the following more detailed description taken in connection with the accompanying drawings in which:

Figure 2 is a top plan view of the spark cell assembly of our invention;

Figure 3 is an elevational view of the structure of Figure 2;

Figure 4 is a side view of the structure of Figure 3;

Figure 5 is an exploded view of the spark cell;

Figure 6 is a perspective view of the cradle member or spark cell holders; and

Figure 7 is a sectional view of the adjusting mechanism taken on line 7—7 of Figure 3.

Figure 1:
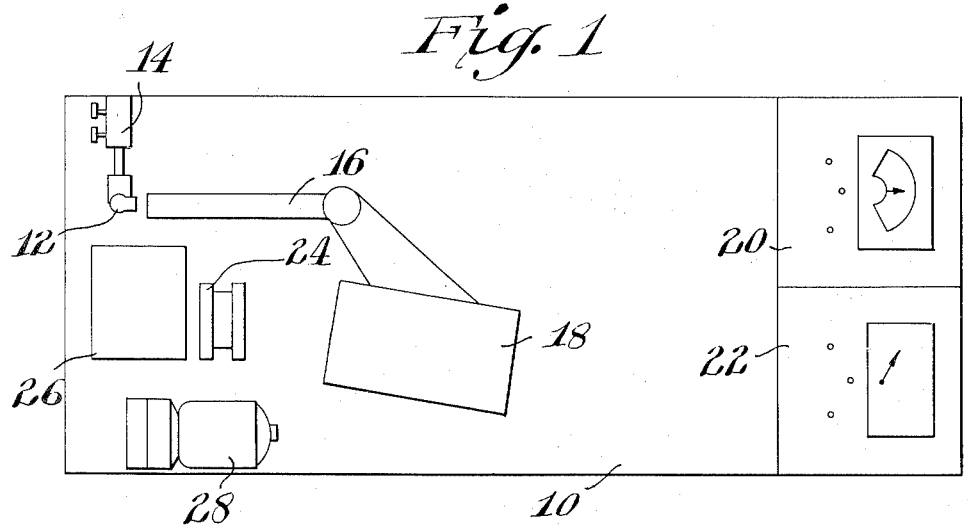
Figure 1 is a top plan view, diagrammatic in character, of a form of spectrographic equipment which includes the spark cell assembly of our invention.
Figure 1:
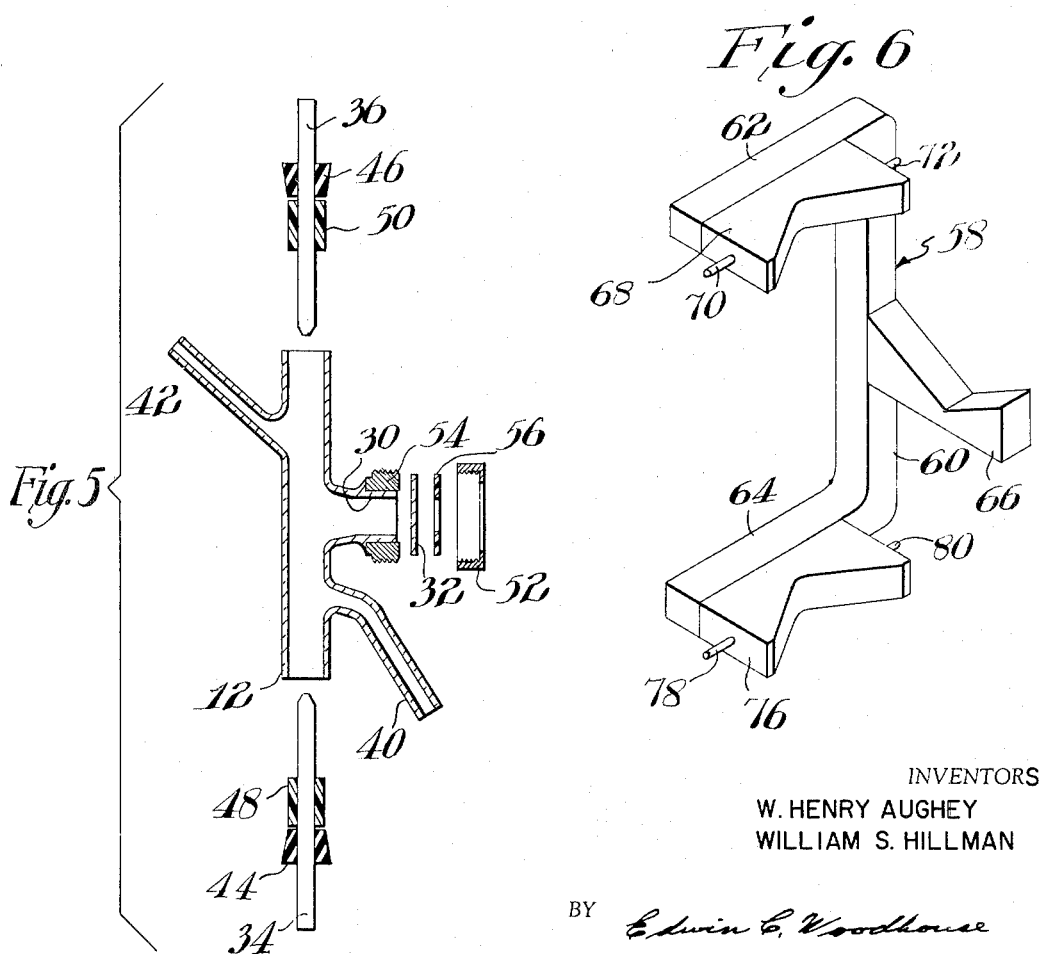

Referring first to Figure 1, the numeral 10 represents the bed of a small truck or cart upon which the spectrographic equipment, enclosed in a protective housing, not shown, is mounted for ready transportation to areas in which the air is to be analyzed. A spark cell 12 is supported by a holder 14 opposite the end of a small quartz spectroscope 16. The radiation, corresponding to the part of the spectrum that is to be measured, is admitted to the housing 18 for a photo-multiplier tube, not shown, which is connected to a microammeter or galvanometer 20. Power for operating the equipment may be supplied by any suitable source such as, for example, by a number of dry cells indicated generally at 22. The power for the spark cell will pass through a condenser 24 and a transformer 26 to provide the high voltage current required to produce the desired spark in the spark cell. A vacuum pump 28 is provided for drawing air through the spark cell and is connected to the air outlet of the spark cell by a suitable conduit or tubing, not shown.

The structure, as so far described, is in general conventional and well-known, and the essential features, electrical circuits and the operation thereof are shown and described in some detail in the articles by Aughey, Koppius and Dieke et al. hereinbefore referred to. The photo-multiplier tube and microammeter may be replaced by photographic plates as in the equipment of Aughey or by a Geiger-Muller counter as in the equipment of Koppius.

Referring now to Figures 2, 3, 4 and 5, and particularly Figure 5, the spark cell 12 comprises a main heavy-walled glass tube of substantially uniform bore having a radiation exit tube 30 extending from one side intermediate the ends thereof, a removable quartz window 32 closing the outer end of the radiation exit tube, opposing aligned longitudinally adjustable electrodes 34 and 36 extending into the main tube through the ends thereof and having their inner ends spaced a small distance apart at the axis of the radiation exit tube so as to provide a spark gap 38 on such axis, and gas inlet and outlet tubes 40 and 42 extending from opposite sides of the main tube intermediate opposite ends of the main tube and the radiation exit tube so that gas passing from the inlet tube to the outlet tube will pass through the spark gap 38. The quartz window is held in place by an annular screw cap 52 which screws onto an externally threaded collar 54 having an hexagonal opening frictionally fitting on an outer hexagonal portion of the radiation exit tube 30. An annular gasket 56, of resilient heat-resisting material, may be interposed between the opposing flat surfaces of the screw cap 52 and the quartz window 32. The electrodes are held in the spark cell by resilient members 44 and 46 which fit into the ends of the main glass tube and frictionally engage the electrodes so that the electrodes may be adjusted longitudinally by hand. Preferably, elongated tubular collars 48 and 50 are positioned between the resilient members 44 and 46, respectively, and the gas inlet and outlet tubes and closely fit the electrodes and the inner walls of the main tube, so as to maintain the electrodes in alignment.

The electrodes may be made of pure copper, pure platinum or other pure metal whose spectrum line is not so close to the lead line or the line of the metal to be determined as to seriously interfere therewith. Preferably, we use electrodes of carbon or graphite as they do not introduce an interfering metal line and materially increase the sensitivity of the equipment to lead. The resilient members 44 and 46 are preferably composed of an elastomeric material, such as natural and synthetic rubber stoppers. The elongated tubular collars 48 and 50 may be made of metal but preferably are made of a suitable heat-resistant material such as polymerized tetrafluoroethylene, hard rubber, polystyrene, and phenoformaldehyde resin, most preferably polymerized tetrafluoroethylene. The gasket 56, preferably, is also made of polymerized tetrafluoroethylene but may be made of other gasket materials which will withstand a moderate amount of heat. The cap 52 and the collar 54, conveniently, are made of brass but may be made of other metals or materials such as those above set forth for the tubular collars 48 and 50.

Referring more particularly to Figures 2, 3, 4 and 6, the spark cell is held in a single position, preferably with the longitudinal axis of the main tube extending vertically, by a cradle member 58, best shown in Figure 6. The cradle member comprises a U-shaped frame, consisting of two parallel horizontal legs 62 and 64 connected by a vertical member 60. Intermediate the height of the member 60, there is provided an elongated narrow horizontal extension 66 having a wide V-shaped depression in its upper surface, such extension and such depression lying in a vertical plane which extends at right angles to the vertical plane of the legs 62 and 64. The upper leg 62 carries a wide flat horizontal extension 68, extending a short distance from the same side of the frame as the extension 66 and having a wide V-shaped depression in its long outer horizontal edge and lying in the horizontal plane of such edge. Pins 70 and 72 extend outwardly from the short side edges of the extension 68 detachably engaging the ends of a spring clamp 74. The lower leg 64 carries a similar wide flat horizontal extension 76 which extends a short distance from the same side of the frame as the extensions 66 and 68, has a wide V-shaped depression in its long outer horizontal edge and is provided with pins 78 and 80 extending outwardly from its short side edges to detachably engage the ends of a spring clamp 82. In other words, the extensions 68 and 76 are identical in size, shape and construction and are similarly positioned but are spaced apart vertically by a distance substantially equal to the distance between the gas inlet 40 and gas outlet 42 of the spark cell.

In use, the spark cell is placed in the cradle member 58 with the radiation exit tube 30, the collar 54 or the cap 52, as desired, resting in the V-shaped depression in the upper surface of the extension 66, whereby the cradle member supports the spark cell and prevents rotation of the spark cell about its vertical axis. At the same time, the V-shaped depressions in the extensions 68 and 76 bear against the sides of the spark cell, preferably just below the gas inlet and gas outlet tubes 40 and 42, with the spring clamps 74 and 82 passing around the main tube of the spark cell and detachably securing the spark cell to the horizontal extensions 68 and 76 whereby the spark cell is prevented from rotating about a horizontal axis, the extensions 68 and 76 and the spring clamps also helping to support the spark cell. It will be apparent that the spring clamps and the pins therefor may take other forms and that other known types of separable fastening means may be substituted therefor. Also, the extension 66 may be similarly provided with spring clamps or other type of separable fastening means for more firmly maintaining the radiation exit tube in the V-shaped depression of such extension, but such fastening means are usually unnecessary. Furthermore, the cradle member may take other forms, provided that it is so designed as to hold the spark cell in a single predetermined position.

The cradle member 58 is rigidly mounted on an elongated carriage 84 which extends horizontally in the opposite direction from the extension 66. The carriage has a longitudinal track-receiving recess 86 for a track 88 mounted on a track bed 90. The track is provided with a longitudinally extending rack 92. The carriage 84 is provided with pinion 94 on a shaft 96 for engaging the teeth of the rack. The shaft 96 is provided with a hand wheel 98 for manually operating the pinion. The carriage 84 is also provided with a set screw 100 which engages the shaft 96 to lock it against undesired movement. The track bed 90 carries a longitudinally extending scale 102 on one side thereof, and the carriage 84 carries a cooperating vernier scale 104. Such mechanism constitutes adjusting mechanism for manually adjusting the position of the spark cell horizontally across the optical axis of the spectroscope, id est, of the spectrographic apparatus, and locking it in the adjusted position, and the scales 102 and 104 indicate the adjusted position of such mechanism, of the cradle member, of the spark cell and of the spark gap.

The track bed 90 is rigidly secured to a vertically extending carriage 106 by an angle iron 107. The carriage 106 engages and rides on a vertical track 108, similar to track 88, supported on a stationary track bed 110 which is firmly secured to a supporting member 112 which may be a wall of the housing enclosing the equipment or other support mounted on the truck bed 10. The carriage 106 is manually moved vertically along the track 108 by a rack 114 and a manually operated pinion mechanism 116, similar to the rack 92 and pinion mechanism 94, 96 and 98. The carriage 106 is provided with an L-shaped member 118 which extends over the side of the track bed 110 and carries a set screw 120 which engages the side of such track bed to lock the carriage in vertically adjusted position. The track bed 110 carries a longitudinally extending scale 122 on one side thereof, and the carriage 106 carries a cooperating vernier scale 124. Such mechanism constitutes adjusting mechanism for manually adjusting the position of the spark cell vertically across the optical axis of the spectroscope or spectrographic apparatus and locking it in the adjusted position, and the scales 122 and 124 indicate the adjusted position of such mechanism, of the cradle member, of the spark cell and of the spark gap.

In operation, the quartz window 32 will be removed and a spark gap gauge inserted through the radiation exit tube so as to extend into the center of the spark cell. A simple form of spark gap gauge consists of an elongated rod of a thickness corresponding to the desired size of the spark gap, usually about ¼ inch, having an enlarged portion fitting smoothly in the radiation exit tube or having a cap-like portion fitting over the end of the radiation exit tube and which may be screw-threaded to screw onto the collar 54. With such gauge in place, the electrodes are inserted in the spark cell and adjusted to bring their ends against the sides of the gauge. Thereby, the size and position of the spark gap in the spark cell are uniformly and accurately set. Thereupon, the gauge is removed, the radiation exit window is secured in position, and the spark cell is fastened in position in the cradle member 58, the gas outlet 42 is connected to the vacuum pump 28, and the gas inlet 40 is connected to a supply of air containing a known proportion of tetraethyl lead.

The equipment is then operated with such supply of air while moving the spark gap horizontally and vertically relative to the optical axis of the spectrographic apparatus by operation of the rack and pinion adjusting mechanisms, until the spark gap is adjusted to that position which produces the optimum intensity of the lead line in the spectrographic apparatus. The adjusting mechanisms are then locked in position and a record thereof, as shown on the scales, is made. The equipment is then in condition for calibration in the usual manner, and for use in detecting leaks in tetraethyl lead manufacturing apparatus by drawing air from the suspected areas through a suitable long tube connected to the gas inlet 40.

When it becomes necessary to clean the spark cell, it is readily removed from the cradle member, disassembled and cleaned. The removable radiation exit window facilitates the cleaning thereof and of the radiation exit tube and permits a more thorough cleaning of such parts. After the spark cell has been cleaned, the removable radiation exit window permits the spark gap gauge to be used in reassembling the spark cell so that the spark gap is readily and quickly readjusted accurately to its original size and position in the spark cell, preferably centered on the axis of the radiation exit tube. Thereafter, it is only necessary to replace the spark cell in the cradle member with the rack and pinion operated adjusting mechanisms set in their previously determined and recorded optimum positions as shown by the scales. The equipment is immediately in condition for its desired use, and it is not necessary to again resort to the time consuming and unsatisfactory trial and error procedure of determining the optimum position of the spark gap.

By this invention, even the delays, caused by the necessity of cleaning the spark cells, can be eliminated. This can be accomplished by employing two or more spark cells, each having a removable radiation exit window, by replacing a spark cell, which needs cleaning, with a second clean spark cell and continuing the use of the equipment with the second spark cell while the first is being cleaned. Different spark cells, even when substantially identical in size and construction, frequently have different characteristics and require different settings of the adjusting mechanisms. Therefore, each spark cell must be first tested to determine its optimum position and such position recorded. Thereafter, when one spark cell is substituted for another, it is merely necessary to reset the adjusting mechanisms to the recorded positions previously determined to be optimum for such spark cell, whereupon the equipment is immediately ready for use without further testing.

It will be understood that the drawings are merely illustrative and that our invention is not limited to the specific embodiment disclosed therein and described in detail in this specification. On the other hand, it will be apparent to those skilled in the art that many changes can be made in the details of construction of the various parts and that obvious mechanical equivalents can be substituted for various elements and combinations thereof, such as the fastening means, adjusting mechanisms, locking means, form of scales and the like, without departing from the spirit or scope of our invention, particularly as set forth in the general description and in the claims appended hereto.

It will be apparent that, by our invention, we have provided a novel spark cell assembly which permits the spark cell to be readily removed, cleaned and rapidly and easily reassembled and replaced in the spectrographic equipment, or replaced by another clean spark cell, with the spark gap accurately readjusted to the desired position relative to the optical axis of the spectrographic apparatus for receiving and measuring the radiation from the spark gap so that the reassembled equipment is immediately ready for use and will accurately reproduce the results obtained with the equipment as originally assembled. Thus, our invention overcomes the disadvantages of the equipment previously employed, particularly eliminating the long delays previously caused by the necessity of determining, by trial and error, the optimum conditions each time the equipment is reassembled or a spark cell is replaced by a different spark cell, and the unsatisfactory results of such determinations. Accordingly, it is apparent that our invention constitutes a valuable advance in and contribution to the art.

We claim:

1. A spark cell adapted to be employed with spectrographic apparatus for receiving and measuring the intensity of the radiation from the spark cell, which comprises a main tube which is an elongated heavy-walled glass tube having its longitudinal axis extending vertically, a radiation exit tube projecting horizontally from one side of the main tube intermediate the ends thereof, a removable quartz window closing the outer end of the radiation exit tube, a gas inlet tube extending from one side of the main tube intermediate an end thereof and the radiation exit tube, a gas outlet tube extending from the opposite side of the main tube intermediate the other end thereof and the radiation exit tube, opposing aligned electrodes extending into the main tube through the ends thereof and having their inner ends spaced a small distance apart at the axis of the radiation exit tube so as to provide a spark gap on such axis, resilient means in each end of the main tube surrounding and frictionally engaging the electrodes and holding them in their longitudinally adjusted positions.

2. A spark cell adapted to be employed with spectrographic apparatus for receiving and measuring the intensity of the radiation from the spark cell, which comprises a main tube which is an elongated heavy-walled glass tube having its longitudinal axis extending vertically, a radiation exit tube projecting horizontally from one side of the main tube intermediate the ends thereof, a removable quartz window closing the outer end of the radiation exit tube, a gas inlet tube extending from one side of the main tube intermediate an end thereof and the radiation exit tube, a gas outlet tube extending from the opposite side of the main tube intermediate the other end thereof and the radiation exit tube, opposing aligned electrodes extending into the main tube through the ends thereof and having their inner ends spaced a small distance apart at the axis of the radiation exit tube so as to provide a spark gap on such axis, resilient means in each end of the main tube surrounding and frictionally engaging the electrodes and holding them in their longitudinally adjusted positions, and elongated tubular collars positioned between the resilient means and the gas inlet and outlet tubes closely fitting the electrodes and the inner walls of the main tube and maintaining the electrodes in alignment.

3. A spark cell adapted to be employed with spectrographic apparatus for receiving and measuring the intensity of the radiation from the spark cell, which comprises a main tube which is an elongated heavy-walled glass tube having its longitudinal axis extending vertically, a radiation exit tube projecting horizontally from one side of the main tube intermediate the ends thereof, a removable quartz window closing the outer end of the radiation exit tube, a removable annular cap screw-threaded onto the outer end of the radiation exit tube enclosing the periphery of the quartz window and holding it in position, a gas inlet tube extending from one side of the main tube intermediate an end thereof and the radiation exit tube, a gas outlet tube extending from the opposite side of the main tube intermediate the other end thereof and the radiation exit tube, opposing aligned electrodes extending into the main tube through the ends thereof and having their inner ends spaced a small distance apart at the axis of the radiation exit tube so as to provide a spark gap on such axis, resilient means in each end of the main tube surrounding and frictionally engaging the electrodes and holding them in their longitudinally adjusted positions, and elongated tubular collars positioned between the resilient means and the gas inlet and outlet tubes closely fitting the electrodes and the inner walls of the main tube and maintaining the electrodes in alignment.

References Cited in the file of this patent

UNITED STATES PATENTS

| | | |
|---|---|---|
| 588,689 | Bausch | Aug. 24, 1897 |
| 1,080,968 | Hayes | Dec. 9, 1913 |
| 1,121,077 | Dubilier | Dec. 15, 1914 |
| 1,173,562 | Ditcham | Feb. 29, 1916 |
| 2,206,344 | Borchardt | July 2, 1940 |
| 2,643,574 | Todd | June 30, 1953 |